US009790312B2

(12) United States Patent
Ausserre et al.

(10) Patent No.: US 9,790,312 B2
(45) Date of Patent: Oct. 17, 2017

(54) SELF-ASSEMBLED MATERIAL, IN PARTICULAR A POLYMERIC OR OLIGOMERIC MATERIAL, HAVING A NON-CENTROSYMMETRIC LAMELLAR STRUCTURE

(75) Inventors: Dominique Ausserre, Soulitre (FR); Laurent Fontaine, Le Mans (FR)

(73) Assignee: DOMINIQUE AUSSERRE, Soulitre (FR)

( * ) Notice: Subject to any disclaimer, the term of this patent is extended or adjusted under 35 U.S.C. 154(b) by 911 days.

(21) Appl. No.: 14/351,121

(22) PCT Filed: Jun. 15, 2012

(86) PCT No.: PCT/IB2012/053041
§ 371 (c)(1),
(2), (4) Date: Sep. 26, 2014

(87) PCT Pub. No.: WO2012/172522
PCT Pub. Date: Dec. 20, 2012

(65) Prior Publication Data
US 2015/0299369 A1    Oct. 22, 2015

(30) Foreign Application Priority Data
Jun. 15, 2011  (FR) ..................................... 11 55209

(51) Int. Cl.
*C08F 297/04*  (2006.01)
*C08F 299/02*  (2006.01)
*B82Y 30/00*  (2011.01)
*C08G 81/02*  (2006.01)

(52) U.S. Cl.
CPC ............ *C08F 299/02* (2013.01); *B82Y 30/00* (2013.01); *C08F 297/046* (2013.01); *C08G 81/027* (2013.01)

(58) Field of Classification Search
CPC .... C08F 299/03; C08F 297/046; B82Y 30/00; C08G 81/027
See application file for complete search history.

(56) References Cited

U.S. PATENT DOCUMENTS 7,632,544 B2    12/2009 Ho et al.

OTHER PUBLICATIONS

Abetz et al. Macromol. Rapid Commun. 21, 1 2000.*
Goldacker et al. Nature, 398, 1999.*
Ausserre Macromolecules 2012, 45, 2478-2864.*
N. K. Lape et al., "Barrier Membranes of Self-Assembled Lamellar Poly(lactide-isoprene-lactide) Triblock, Copolymers", Journal Membrane Science, 2005, vol. 259, pp. 1-9.
(Continued)

*Primary Examiner* — Mark Kaucher
(74) *Attorney, Agent, or Firm* — Baker & Hostetler LLP

(57) ABSTRACT

A material is provided having a lamellar, non-centrosymmetric macroscopic structure, essentially consisting of a mixture of at least two populations of objects that are heterogeneous in blocks along an axis, each object consisting of at least two blocks, characterized in that each of the objects is connected to adjacent objects via interactions that involve at least two mutually incompatible blocks of the object and two blocks that are compatible one-to-one with the first of the blocks, and mutually incompatible along the chain of each one of said adjacent objects. The objects can be, in particular, block co-oligomers or copolymers.

25 Claims, 4 Drawing Sheets

(56) References Cited

OTHER PUBLICATIONS

O. Lopez-Pamies et al., "Multiscale Modeling of Oriented Thermoplastic Elastomers with Lamellar Morphology", Journal of Mechanics and Physics of Solids, 2008, vol. 56, pp. 3206-3223.
C. Park et al., "Enabling Nanotechnology with Self Assembled Block Copolymer Patterns", Polymer, 2003, vol. 44, pp. 6725-6760.

* cited by examiner

PRIOR ART

SELF-ASSEMBLED MATERIAL, IN PARTICULAR A POLYMERIC OR OLIGOMERIC MATERIAL, HAVING A NON-CENTROSYMMETRIC LAMELLAR STRUCTURE

CROSS-REFERENCE TO RELATED APPLICATIONS

This application is a National Stage of International patent application PCT/IB2012/053041, filed on Jun. 15, 2012, which claims priority to foreign French patent application No. FR 1155209, filed on Jun. 15, 2011, the disclosures of which are incorporated by reference in their entirety.

FIELD OF THE INVENTION

The invention relates to a self-assembled material, in particular based on polymers or oligomers, exhibiting a lamellar structure with a non-centrosymmetric order.

BACKGROUND

Self-assembled edifices play an important role in the development of novel nanostructured materials. Among them, the simplest, most organized and most robust are certainly those which spontaneously form block copolymers as they adopt, during simple annealing operations at temperatures of the order of 150° C., particularly regular periodical composite structures of lamellae, cylinders or spheres which endure in the solid state when they are cooled to normal temperature. The mechanisms which underlie this self-assembling are largely independent of the exact chemical nature of the copolymers and the pitch of the structure can be adjusted typically between 5 and 100 nm by varying only the length of the blocks. The number of applications of the block copolymers, used pure or mixed with homopolymers or solvents, is immense and, whether they are compatibilizing agents for elastomeric materials, biocompatible materials, ultraresistant plastics, adhesives, manufacturing techniques in microelectronics or in micro- and nanotechnologies, manufacture of nanoporous or nanostructured materials (hydrogen storage, catalysis, photonic crystals, and the like), their chemical variety is very high.

Mention may be made, by way of example, of the following review articles:
1) Anne-Valérie Ruzette and Luwik Leibler, *Nature Materials*, 4, pp. 19-31 (2005), "Block copolymers in tomorrow's plastics";
2) Ludwik Leibler, *Prog. Polym. Sci.*, 30 (2005), 898-914, "Nanostructured plastics: Joys of self-assembling";
3) Cheolmin Park, Jongseung Yoon and Edwin L. Thomas, *Polymer*, 44 (2003), 6725-6760, "Enabling nanotechnology with self-assembled block copolymer patterns";
4) Leonard Pinchuk, Gregory J. Wilson, James J. Barry, Richard T. Schoephoerster, Jean-Marie Parel and Joseph P. Kennedy, *Biomaterials*, 29 (2008);
5) Sang Ouk Kim, Harun H. Solak, Mark P. Stoykovich, Nicola J. Ferrier, Juan J. de Pablo and Paul F. Nealey, Nature, 424 (2003), 411-414;
6) Massimo Lazzari and M. Arturo Lopez-Quintela, *Advanced Materials*, 15 (19), 1583-1594 (2003), "Block Copolymers as a Tool for Nanomaterial Fabrication";
7) Costantino Creton, Guangjun Hu, Fanny Deplace, Leslie Morgret and Kenneth R. Shull, *Macromolecules*, 42, (2009), 7605-7615;
8) Yu-Chih Tseng and Seth B. Darling, Polymers 2010, 2, 470-489, "Block Copolymer Nanostructures for Technology";
9) Ho-Cheol Kim, Sang-Min Park and William D. Hinsberg, *Chem. Rev.*, 110, pp. 146-177, "Block Copolymer Based Nanostructures: Materials, Processes and Applications to Electronics";
10) Ho, Fan, Tseng, Chiang, Lin, Ko, Huang, Shih and Chen, U.S. Pat. No. 7,632,544 B2 (2009), "Nanopatterned templates from oriented degradable diblock copolymer thin films";
11) Nikos Hadjichristidis, Hermis Latrou, Marinos Pitsikalis, Stergios Pispas and Apostolos Avgeropoulos, "Linear and non-linear triblock terpolymers. Synthesis, self-assembly in selective solvents and in bulk", *Prog. Polym. Sci.*, 30 (2005), 725-782.

FIGS. 1A-1C illustrate the various lamellar structures known from the prior art which can be formed by an AB diblock copolymer. It will be assumed, in the systematic description, that the two blocks are immiscible, which is generally the case with two polymers having different chemical natures, and that they have the same length and the same volume. The free energy F per chain of this system, the minimum of which describes the equilibrium configuration, is written as the sum of two terms: $F = \gamma_{AB}\Sigma + F_{el}$. See, in this connection:
12) Alexander, S. *J. Phys.* (Paris), 38 (1977), p. 983;
13) de Gennes, P. G., *Macromolecules*, 13 (1980), p. 1069;
14) Abetz, V., Stadler, R. and Leibler, L., *Polym. Bull.*, 37 (1996), p. 135;
15) Birshtein, T. M., Polotsky, A. A. and Amoskov, V. M., *Macromol. Symp.*, 146 (1999), p. 215;
16) Semenov, A. N. and Rubinstein, M., *Macromolecules*, 1998, 31, 1373;
17) I. Ya. Erukhimovich, M. V. Belousov, E. N. Govorun, V. Abetz and M. V. Tamm, "Non-Centrosymmetric Lamellar Structures in the Associating Blends of Tri- and Diblock Copolymers", *Macromolecules*, 43 (2010), pp. 3465-3478;
18) Semenov, A. N., 1985, Soviet Phys. JETP, 61, 733;
19) Milner, S. T., Witten, T. A. and Cates, M. E., 1988, Europhys. Lett., 5, 413;
20) Milner, S. T., Witten, T. A. and Cates, M. E., 1988, Macromolecules, 21, 2610;
21) Milner, S. T., Witten T. A. and Cates, M. E., 1988, Macromolecules, 22, 853;
22) Milner, S. T. and Witten, T. A., 1988, J. Phys. Paris, 19, 1951
23) Yang Yuliang, Qiu Feng, Tang Ping and Zhang Hongdong, *Science in China: Series B Chemistry* (2006), Vol. 49, No. 1, 21-43
24) M. W. Matsen and F. S. Bates, "Unifying strong- and weak-segregation block copolymer theories", Research Report UMSI 95/164 (1995)
25) M. W. Matsen and M. Schick, Phys. Rev. Letters, 72 (16), pp. 2660-2663 (1994).

The first term represents the contact energy between A and B, that is to say the product of their interfacial tension and the contact area per chain. It decreases when the chains stretch perpendicularly to the lamellae and this stretching is reflected by the presence of the second term, which describes an elastic energy. At equilibrium, these two terms observe the rule of equipartition in the three directions of space. They respectively represent $\frac{2}{3}$ and $\frac{1}{3}$ of the total energy, which is thus written $F = (3/2)\gamma_{AB}\Sigma$. By dividing the energy per chain by the molecular volume $\Sigma l$, $l$ denoting the height of a molecule, a particularly simple expression is obtained for the volume energy density of the material, which is $$f = \frac{\frac{3}{2}\gamma_{AB}}{l}.$$

It shows that this density is simply proportional to the number of interfaces per unit of length along z, z being an axis normal to the lamellae. In order to form as few AB interfaces as possible, the lamellar order is periodic and composed of bilayers. It is written AB/BA/AB/BA . . . . This structure, illustrated in FIG. 1A, is symmetric. Its energy is virtually half that of the competing nonsymmetric order AB/AB/AB/AB, represented in FIG. 1B, since it comprises virtually half as many AB interfaces per unit of volume ("virtually" only, because the equilibrium thickness of the lamellae is greater, which is not taken into account in the figures). In fact, this non-centrosymmetric order has never been observed in practice.

FIG. 1C illustrates a defect of stacking in the symmetric structure of FIG. 1A. Defects of this type exhibit an energy which is too high to be stable, which explains the nonexistence in practice of the non-centrosymmetric structure of FIG. 1B.

In the figures, the references 1 and 1' indicate "realistic" representations in which the diblocks are represented in the form of entangled linear chains, while the references 2, 2' and 2" indicate more diagrammatic representations.

More generally, the block sequential copolymers organize themselves according to the following rule: two chemically similar (referred to simply as "similar") sequences tend to unite and two chemically different sequences tend to separate. The associating of similar sequences takes place both laterally (by entangling of similar neighboring blocks) and longitudinally (by interpenetration of similar end blocks); see 26) F. S. Bates and G. H. Fredrickson, "Block Copolymer Thermodynamics—Theory and Experiment", Annual Review of Physical Chemistry, 41, p. 525 (1990).

Inside a bilayer, the similar blocks A and B of the molecules in contact are assembled. Subsequently, the term "chemical dipolar interaction" will be used to describe this double association of molecules via the two blocks A and B.

It should be pointed out that the individual bilayers are not connected to one another, which is reflected by a low resistance of the material to shearing.

As explained above, for energy reasons, these materials virtually exclusively form centrosymmetric self-assembled structures. In point of fact, many applications of great technological interest require non-centrosymmetric (NCS) structures which make it possible to obtain materials exhibiting a second-order nonlinear optical response (for the production of components for optical telecommunications and integrated optics), piezoelectric properties (for sensors or actuators), pyroelectric properties (for detectors), a ferromagnetic or ferroelectric behavior, and the like.

This is why a very particular effort has been undertaken for about twenty years in an attempt to obtain self-assembled materials based on copolymers exhibiting a non-centrosymmetric order, this being the case in particular in lamellar structures where this order is expressed simply by an absence of symmetry with respect to the +z and −z directions.

The first NCS structure of a material formed of block copolymers is due to Goldacker et al.

27) Thorsten Glacer, Volker Abetz, Reimund Stadler, Igor Erukhimovich and Ludwik Leibler, "Non-centrosymmetric superlattices in block copolymer blends", Nature, 398 (1999), pp. 137-139.

It is composed of a mixture of an ABC triblock and an ac diblock, the small letters representing markedly shorter blocks than the capital letters. The NCS order is based on the following properties:

The interfacial tension between two similar entities ($\gamma_{AA}$, $\gamma_{BB}$), which can be negative, exhibits in all cases a very low modulus with respect to the interfacial tension—positive—between two immiscible entities ($\gamma_{AB}$ . . . ).

The interfacial tension for interpenetration between chemically similar blocks having different length (such as $\gamma_{Aa}$ and $\gamma_{Bb}$) is algebraically lower (in algebraic value) than the interpenetration tension between similar blocks having the same length ($\gamma_{AA}$, $\gamma_{BB}$).

To simplify, in the continuation, $\gamma_{AB}=\gamma_{AC}=\gamma_{BC}=\gamma$ will be set down.

Due to these properties, the stack ABC/ca/ABC/ca . . . is slightly favored on the energy level, with respect to the stack ABC/CBA/ac/ca/ABC/ac/ca . . . or to any other stack comprising bilayers, and the NCS structure is predominantly present. In these materials, the NCS order thus rests on a very slight preference, which means that the centrosymmetric order is also present in a noninsignificant proportion. Furthermore, the intercalation of a simple bilayer, such as ca/ac, in the structure is sufficient to reverse the ABC order into the CBA order via an ABC/ca/ac/CBA sequence. This defect of stacking does not require any additional interface between immiscible entities. The associated energy is very low and the defect is frequent. This results in materials composed of microscopic domains having both centrosymmetric and non-centrosymmetric structure, in which, furthermore, the non-centrosymmetric regions exhibit frequent reversals of polarity. This solution is thus not readily applicable to the manufacture of monodomain NCS samples of macroscopic size (dimensions greater than or equal to 1 mm).

An alternative form of this material was recently proposed in a theoretical work by Erukimovich et al. (abovementioned reference 17). It consists in fixing the associations between long and short blocks, such as A and a, by groups which are donating/accepting with respect to the chain ends. This alternative form is more complicated from a chemical viewpoint. It is also difficult to implement as the encounter between two complementary ends is of very low probability. Finally, this solution makes it possible only to fix the self-assembled structure which has formed beforehand and which, as has been explained above, comprises numerous defects.

Another example of preferably non-centrosymmetric material was obtained by Takano et al.:

28) A. Takano, K. Soga, J. Suzuki and Y. Matsushita, "Noncentrosymmetric Structure from a Tetrablock Quarterpolymer of the ABCA Type", Macromolecules, 36 (2003), pp. 9288-9291.

The material is pure and composed of ABCA tetrablocks, with two A blocks of the same length. It is preferably arranged according to the lamellar sequence ABCA/ABCA/ABCA . . . rather than according to ABCA/ACBA/ABCA . . . . The reason for this is a slight asymmetry between the lengths of the B and C blocks which leads the ends A to adopt different degrees of stretching, then behaving as if they had different lengths. The mechanism is thus very similar to that of the preceding example. Here again, there exists competing symmetric orders and the preference for the non-centrosymmetric order remains very slight.

Another example has been obtained by Abetz and Goldacker with a mixture of two triblocks identical in composition but having central blocks of unequal length. In this example, the interpenetration is monopolar (adjacent molecules in the material are bonded to one another via interactions between one block only of each said molecule) and the material is full of defects and is brittle:

29) Volker Abetz and Thorsten Goldacker, Macromol. Rapid Commun., 21, 16-34 (2000).

The same authors in the same paper also reported that a mixture in equal parts of two ABC and BAC triblocks exhibits a mixture of symmetric and nonsymmetric regions, with here again many defects.

Also, in these four examples, the layers are still unconnected and can easily slide over one another, resulting in a high mechanical brittleness.

Yet another example of a preferably non-centrosymmetric material has been given by Stupp et al.:

30) S. I. Stupp, V. LeBonheur, K. Walker, L. S. Li, M. Keser and A. Amstutz, Science, 276 (1997), p. 384;
31) Leiming Li and Samuel I. Stupp, Applied Physics Letters, 78 (26), pp. 4127-4129 (2001).

These self-assembled materials are formed of diblocks or triblocks in which at least one block is rigid. The molecules associate together in "bouquets" which are subsequently arranged head to tail and are encountered stacked parallel and oriented in the same direction. Films of a few hundred layers have thus been obtained with a polar arrangement but their $\chi^{(2)}$ coefficient (second-order nonlinear electric susceptibility) remains low. Furthermore, their chemical synthesis is very unwieldy, which excludes any industrial use. Finally, experience shows that these materials can with difficulty receive hyperpolarizable groups capable of strongly modifying their $\chi^{(2)}$ coefficient.

SUMMARY OF THE INVENTION

The invention is targeted at overcoming the abovementioned disadvantages of the prior art and at providing self-assembled materials based on polymers or oligomers, exhibiting a lamellar structure with a uniform non-centrosymmetric order at the macroscopic scale, which are very stable, both from a mechanical and from a thermodynamic viewpoint.

In accordance with the invention, such an aim is achieved by a material exhibiting a macroscopic structure of lamellar and non-centrosymmetric type, essentially composed of a mixture of at least two block copolymers or co-oligomers, each composed of a chain of at least two polymer or oligomer blocks, characterized in that each molecule of said copolymers or co-oligomers is bonded to adjacent molecules (and in particular to the majority of the adjacent molecules) via interactions involving at least two blocks which are immiscible with one another belonging to its chain and two blocks which are compatible one to one with the first said blocks and incompatible with one another along the chain of each said adjacent molecule.

The term "macroscopic structure" is understood to mean a substantially homogeneous structure, apart from possible point defects, in a volume of at least 1 $\mu m^3$, preferably of at least 1000 $\mu m^3$ and more preferably of at least 1 $mm^3$ or else, in the case of a material as a thin layer (with a thickness of less than or equal to 1 $\mu m$), over a surface area of at least 1 $\mu m^2$, preferably of at least 100 $\mu m^2$ and more preferably of at least 1 $mm^2$.

In the abovementioned paper by Volker Abetz and Thorsten Goldacker (reference 29), a description is given of a material composed of a mixture in equal parts of two ABC and BAC triblocks, the structure of which—formed by highly deformed lamellae—exhibits an alternation of centrosymmetric and non-centrosymmetric domains, the size of which is typically of the order of a few tens of nanometers. Under these conditions, it is not possible to speak of a macroscopic structure of lamellar and non-centrosymmetric type within the meaning of the invention.

According to various embodiments of the invention:

In said material having a non-centrosymmetric lamellar structure, each molecule of said copolymers or co-oligomers can be bonded to each adjacent molecule in all the directions of the material, with the exception of the direction perpendicular to the lamellae, via interactions involving at least two blocks which are immiscible with one another belonging to its chain and two blocks which are compatible one to one with the first said blocks and incompatible with one another along the chain of each said adjacent molecule.

Said copolymers or co-oligomers can exhibit a linear or comb-shaped chain.

Said material can be essentially composed of a mixture of M block copolymers or co-oligomers, indexed by m, each composed of a linear chain of P(m) polymer or oligomer blocks chosen from N individual units, with N≥3, P(m)≥2 and M≥2, the adjacent individual units in each linear chain being chosen to be immiscible with one another.

Each said linear chain of polymer or oligomer blocks can constitute a portion of length P(m)≥2 of a sequence obtained by periodic repetition of an orderly set of said individual units. More particularly, said material can be essentially composed of a mixture of 3 block copolymers or co-oligomers, each composed of a linear chain of 3 polymer or oligomer blocks chosen from 3 individual units, the adjacent individual units in each linear chain being chosen to be immiscible with one another.

Said material can be formed by a stack of lamellae, each of said lamellae being formed of just one chemical entity constituting a said block, or else of chemical entities forming compatible blocks, the chains of said polymers or oligomers exhibiting an orientation generally perpendicular to said lamellae.

Said copolymers or co-oligomers can be mixed in substantially equal molar proportions.

Said copolymers or co-oligomers can exhibit substantially identical lengths.

The blocks which are identical or compatible with one another belonging to different copolymers or co-oligomers can exhibit substantially identical lengths.

Each of said copolymers or co-oligomers can exhibit two end blocks and one or more "central" blocks between said end blocks; at least one central block of a said copolymer or co-oligomer can be compatible with at least two end blocks of other said copolymers or co-oligomers, said end blocks exhibiting different closest neighbors, and in which said central block exhibits a length substantially equal to the sum of the end blocks of the other said copolymers or co-oligomers.

The constituent blocks of said copolymers or co-oligomers can themselves be composed of organic molecules, of mesogenic blocks, of organometallic molecules, of nucleotides, of amino acids or of saccharides.

Another subject matter of the invention is a nanocomposite material comprising a matrix composed of a material having a non-centrosymmetric lamellar structure exhibiting a structure as described above and polar or polarizable insertions. The fraction by volume of said insertions can be less than or equal to 50%, preferably less than or equal to 30%, more preferably less than or equal to 10%; more preferably less than or equal to 5%; more preferably less than or equal to 1%.

Said insertions can comprise Janus nanoparticles exhibiting a first side and a second side which are chemically different, said particles being positioned at the level of interfaces between two lamellae which are compatible with said first side and said second side respectively.

As an alternative form or in addition, said insertions can comprise molecules formed by two of said blocks constituting said copolymers or co-oligomers, positioned at the level of interfaces between two lamellae, each of which is compatible with one of the two said blocks.

Said insertions can also comprise linear chains exhibiting two ends formed by two of said blocks constituting said copolymers or co-oligomers, positioned at the level of interfaces between two lamellae, each of which is compatible with one of the two said blocks, and a central part which is incompatible with the two said ends.

Said insertions can also comprise molecules grafted between two said blocks of said copolymers or co-oligomers or between the two sides of said Janus nanoparticles.

Said insertions can exhibit a permanent magnetic and/or electric dipole moment.

Said insertions can exhibit a linear or nonlinear, electric magnetic or optical susceptibility greater by at least a factor of 10 than that of said copolymers or oligomers.

Some notions mentioned above deserve to be clarified:

The term "polymer" is understood to mean a molecule, generally an organic molecule (but not necessarily: there also exists inorganic polymers, such as silicones), composed of a sequence—optionally branched—of a large number (by way of indication, 15 or more) of simpler molecules, referred to as monomers, bonded to one another via covalent bonds. More specifically, the term "homopolymer" is used when the monomers are identical to one another and the term "copolymer" is used when the monomers are different from one another. The monomers can in their turn be macromolecules of complex structure, indeed even polymers or nanoparticles. The designation "polymer" includes biological macromolecules, such as polynucleotides and polypeptides.

The term "oligomer" is understood to mean a molecule, generally an organic molecule (but not necessarily, as for the polymers), composed of a sequence—optionally branched—of a small number (by way of indication, between 2 and 14) of simpler molecules, referred to as monomers, bonded to one another via covalent bonds. The designation "oligomer" includes biological macromolecules, such as oligonucleotides and oligopeptides. The designation "polymer" also includes the blocks known as "mesogenic" . . . which are found in smectic liquid crystals and in "linear polyphilic" molecules. For examples of the syntheses of polyphilic molecules, reference may be made to the following references:

32) Sandrine Pensec, François-Genès Tournilhac, Pierre Bassoul and Claire Durliat, J. Phys. Chem. B, 1998, 102, 52-60;

33) Liliana de Campo, Trond Varslot, Minoo J. Moghaddam, Jacob J. K. Kirkensgaard, Kell Mortensenc and Stephen T. Hyde, online publication http://pubs.rcs.org/doi:10.1039/COCP01201G (2010);

34) I. Ostrovskii, F. G. Tournilhac, L. M. Blinov and W. Howe, J. Phys. II France, 5 (1995), 979-1001;

in which the examples of blocks synthesized are mainly short fluorinated aliphatic chains (32, 33 and 34), hydrophobic hydrocarbon chains (32, 33 and 34) and hydrophilic oligo(ethylene glycol) chains (33), but also rigid cyanobiphenyl groups (34), but can also be oligo-dimethylsiloxane (o-DMS) chains, as in the following reference:

35) R. Amaranatha Reddy, Chenhui Zhu, Renfan Shao, Eva Korblova, Tao Gong, Yongqiang Shen, Edgardo Garcia, Matthew A. Glaser, Joseph E. Maclennan, David M. Walba and Noel A. Clark, Science, 332 (2011), pp. 72-77.

These mesogenic co-oligomers are particularly advantageous in their ferroelectric properties and their short transfer time, which render them suitable for liquid crystal display applications.

The term "linear block copolymer or co-oligomer" or "sequential copolymer or co-oligomer" is understood to mean a copolymer or oligomer formed by two or more individual units, referred to as blocks, bonded to one another in a linear chain via covalent bonds. The blocks are conventionally represented by upper case letters ("A", "B", and the like) or lower case letters ("a", "b"). The blocks can, for example, be linear or nonlinear homopolymers or copolymers or homo- or co-oligomers.

The length of a polymer, of an oligomer or more generally of the individual unit of a linear block copolymer/co-oligomer is a notion which is difficult to define as it is measured in different units depending on the context: monomer, persistence length, or unit of length, the first two varying between blocks of different chemical entities. Subsequently, the sum or the ratio of the lengths of two blocks or chains should be understood as the sum or the ratio, respectively, of the fractions by volume occupied by these blocks or these chains. It should be remembered that polymers always exhibit a statistical distribution of their length; consequently, when it is said that two polymers exhibit the "same" length, this means that the difference between their physical lengths is small with respect to the standard deviation of their statistical distribution and preferably not greater than 30% and preferably not greater than 10%. This dispersion is characterized by the polydispersity index PI, which is the ratio of the average by weight Mw of the molar masses present in the mixture to their average by number Mn.

In a mixture, the term "substantially equal proportions" is understood to mean proportions $P_i$ which, without being strictly equal, satisfy the inequality: $\max(P_i)-\min(P_i) \leq 0.2 \cdot <P_i>$, where $<>$ indicates the arithmetic mean, and preferably the inequality $\max(P_i)-\min(P_i) \leq 0.1 \cdot <P_i>$. The proportions should be understood in moles (and thus in numbers of molecules) and not by weight.

The term "chemical entity" is understood to mean a set of identical molecules.

The term "family of chemical entities" is understood to mean a set of compatible chemical entities, that is to say chemical entities not exhibiting spontaneous phase separation when they are mixed in the form of homopolymers of the same length. Subsequently, two individual units belonging to one and the same family of chemical entities will be represented by one and the same upper case letter ("A", "B", and the like) or lower case letter ("a", "b") in order to qualitatively indicate a difference in chain length, in the event of these individual units being in their turn polymers or oligomers.

Two chemical entities are said to be immiscible when they have a tendency to separate after having been mixed. This is what is known as phase separation. In particular, two polymers or oligomers are considered to be immiscible when their Flory interaction parameter $\chi$ takes a value of greater than zero and preferably of greater than or equal to $10^{-2}$. Two different polymers are generally immiscible. If two chemical entities are not immiscible, it is said that they are compatible. By extension, reference is made to compatible blocks or lamellae to indicate that they are composed of compatible chemical entities.

In the case of a diblock copolymer, the blocks of different nature can exhibit a tendency toward phase separation but they remain bonded to one another via covalent bonds. The phase separation is then reflected by a structuring of the material into microdomains of different composition. This structuring is effective if the product of their Flory interaction parameter $\chi$ by the total number of monomers N of the main chain takes a value of greater than 1 and preferably of greater than or equal to 10 (abovementioned ref. 26). In the case of triblock copolymers, it is necessary to consider three interaction parameters $\chi AB$, $\chi BC$ and $\chi AC$ and several lengths of subchains (AB, BC and AC). It is then considered that the three blocks are immiscible if the product $\chi AB$ (NA+NB) and the two other analogous products are all greater than 0.5 and preferably greater than 5. In the case of copolymers comprising b blocks, identified by indices i and j, it is considered that the b blocks are immiscible if $$\left(\sum_{i,j=1}^{b} X_{ij}\right) N > 1$$

and preferably if $$\left(\sum_{i,j=1}^{b} X_{ij}\right) N > 10,$$

N being the length of the chain of the copolymer, counted in number of monomers.

The term "nanoparticle" is understood to mean a particle, the main diameter or dimension of which is substantially less than 1 μm and preferably less than or equal to 50 nm and preferably less than 15 nm.

The term "affinity" is understood to mean the intensity of the attractive intermolecular interactions between two chemical entities. It can, for example, be measured in the case of the polymers by $1/\chi$.

The term "molecule grafted between two blocks" is understood to mean a molecule attached via two irreversible bonds, in particular covalent bonds, to two different blocks of the main chain. The term "irreversible" is understood to mean bonds which do not come undone spontaneously under the normal conditions of use or storage of the material and on the time scale of its working life. They are, for example, covalent bonds, hydrogen bonds, ionic bonds or organometallic bonds.

With reference to a material, "essentially composed" of a substance "A" is understood to mean that the other components possibly present constitute impurities, or doping agents, the content of which generally does not exceed 20%, and/or inclusions in a matrix composed of said substance "A". Some of these components differ from the constituent elements of the lamellar material in that they do not contribute to unifying the lamellae together. However, they may be necessary to stabilize them by acting as fillers. This is in particular the case with solvents or homopolymers, indeed even diblocks, acting as cosurfactants.

The invention can be generalized to the case of a material formed by an assemblage of objects heterogeneous by blocks along an axis, that is to say formed by a sequence of sections (the blocks). Copolymers and co-oligomers constitute specific cases of such objects; other examples can be (metallic or dielectric) inorganic or organic rods, indeed even viruses. The sections can be different in nature or can exhibit different surface modifications, rendering them compatible (attractive interactions) or incompatible (repulsive interactions or absence of interactions) with one another.

BRIEF DESCRIPTION OF THE DRAWINGS

Other characteristics, details and advantages of the invention will emerge on reading the description, made with reference to the appended drawings, given as nonlimiting examples, in which.

DETAILED DESCRIPTION

Out of concern for simplicity, in the continuation of the description, reference will be made exclusively to "polymers" but, unless otherwise indicated, everything which will be said will also relate to the oligomers.

A material according to the invention is much more stable, both chemically and mechanically, than the NCS structures described above. This is because the structure of such a material is based entirely on dipolar interactions between parallel chemical dipoles, similar to the interactions between two adjacent molecules in the membrane of a diblock. Thus, for example, an ABC molecule can be associated with a CAB molecule via their common dipole AB. The relative directions of the two molecules are then linked. In a lamellar edifice, these molecules cannot be located at the same level. The lamellae are thus connected to one another and it is thus possible to speak of "dipolar interpenetration". By analogy with ferromagnetic materials, this association of parallel chemical dipoles can itself be described as "ferrochemical".

Figure 2:
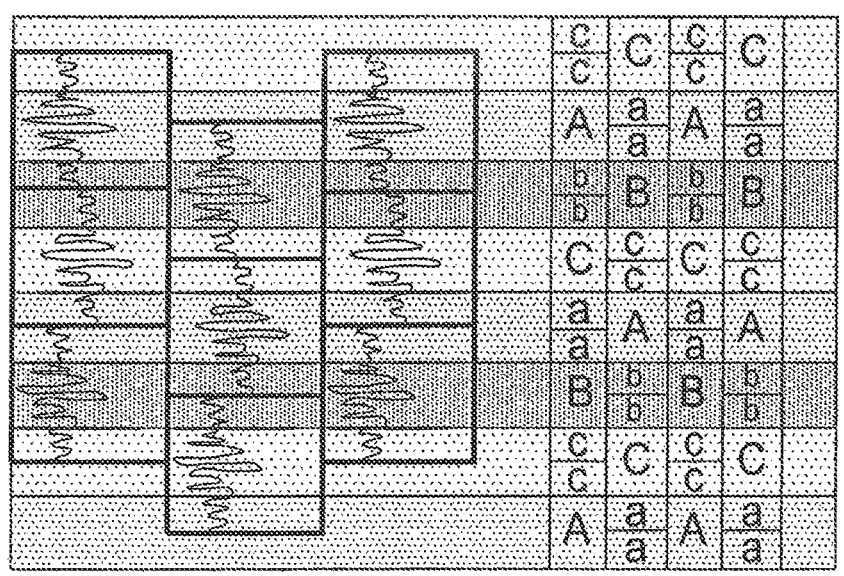
FIG. 2 illustrates the structure of a non-centrosymmetric material according to a first embodiment of the invention.

A first example of ferrochemical material, illustrated in FIG. 2, is composed of a mixture in (substantially) equal proportions of three triblocks. The composition of each triblock is obtained by circular permutation of three immiscible entities A, B and C. In order to allow dipolar associations between all the molecules without creating stress in the medium, the end blocks are half the length of the central blocks; for this reason, the three triblocks are denoted by aBc, bCa, cAb. During an annealing of this mixture, the molecules can only be arranged as illustrated in FIG. 2.

A concrete example of material of this type corresponds to the following choice:
- A/a: polyisoprene (or oligoisoprene);
- B/b: polybutadiene (or oligobutadiene);
- C/c: polystyrene (or oligostyrene).

The three copolymers (polyisoprene/polybutadiene/polystyrene)$_n$, (polybutadiene/polystyrene/polyisoprene)$_n$ and (polystyrene/polyisoprene/poly-butadiene)$_n$ are known from the prior art:
36) Apostolos Avgeropoulos, Stella Paraskeva, Nikos Hadjichristidis and Edwin L. Thomas, Macromolecules, 2002, 35, 4030-4035;
37) Nikos Hadjichristidis, Marinos Pitsikalis and Hermis Iatrou, Adv. Polym. Sci. (2005), 189, 1-124.

A second concrete example of material of this type corresponds to the following choice:
- A/a: poly(2-vinylpyridine) (or oligo(2-vinylpyridine));
- B/b: polybutadiene (or oligobutadiene);
- C/c: polystyrene (or oligostyrene).

The three copolymers (poly(2-vinylpyridine)/polybutadiene/polystyrene)$_n$, (polybutadiene/polystyrene/poly(2-vinylpyridine))$_n$ and (polystyrene/poly(2-vinylpyridine)/polybutadiene)$_n$ are known from the prior art:
38) H. Hückstädt, A. Göpfert and V. Abetz, Polymer, 41 (2000), 9089-9094
39) Hiroshi Watanabe, Takatoshi Shimura, Tadao Kotaka and Matthew Tirrell, Macromolecules (1993), 26, 6338-6345.

A third concrete example of material of this type corresponds to the following choice:
- A/a: polystyrene or oligostyrene;
- B/b: polyisoprene or oligoisoprene;
- C/c: polycyclohexadiene (or oligocyclohexadiene).

The three copolymers (polystyrene/polyisoprene/polycyclohexadiene)$_n$, (polycyclohexadiene/polystyrene/polyisoprene)$_n$ and (polyisoprene/polycyclo-hexadiene/polystyrene)$_n$ are known from the prior art:
40) Xiaojun Wang, Jianfeng Xia, Junpo He, Fengping Yu, Ang Li, Jiangtao Xu, Hongbin Lu and Yuliang Yang, Macromolecules, 2006, 39, 6898-6904.

A fourth concrete example of material of this type corresponds to the following choice:
- A/a: poly(methyl methacrylate) (or oligo(methyl methacrylate));
- B/b: poly[hexa(ethylene glycol) methacrylate] (or oligo[hexa(ethylene glycol) methacrylate]);
- C/c: poly[2-(dimethylamino)ethyl methacrylate] (or oligo[2-(dimethyl-amino)ethyl methacrylate]).

The three copolymers (poly(methyl methacrylate)/poly[hexa(ethylene glycol) methacrylate]/poly[2-(dimethylamino)ethyl methacrylate])$_n$, (poly[2-(dimethylamino)ethyl methacrylate]/poly(methyl methacrylate/poly[hexa(ethylene glycol) methacrylate])$_n$ and (poly[hexa(ethylene glycol) methacrylate]/poly[2-(dimethylamino)ethyl methacrylate]/poly(methyl methacrylate))$_n$ are known from the prior art:
41) Aggeliki L. Triftaridou, Maria Vamvakaki and Costas S. Patrickios, Polymer, 43 (2002), 2921-2936.

A fifth concrete example of material of this type corresponds to the following choice:
- A/a: polystyrene (or oligostyrene);
- B/b: poly(D,L-lactide) (or oligo(D,L-lactide));
- C/c: polyisoprene or oligoisoprene.

The three copolymers (polystyrene/poly(D,L-lactide)/polyisoprene)$_n$, (polyisoprene/polystyrene/poly(D,L-lactide))$_n$ and (poly(D,L-lactide)/polyisoprene/polystyrene)$_n$ are known from the prior art:
42) David A. Olson, Liang Chen and Marc A. Hillmyer, Chem. Mater., 2008, 20, 869-890.

Furthermore, by virtue of the recent advances in the techniques which allow them to be chemically synthesized, it is today accepted that it is possible for a person skilled in the art to manufacture virtually any arrangement of arbitrarily chosen blocks. The references below illustrate, by a few examples, the variety of the synthetic techniques available:
43) Kelly A. Davis and Krzysztof Matyjaszewski, Macromolecules, 34 (2001), pp. 2101-2107;
44) Holger Schmalz, Armin Knoll, Alejandro J. Müller and Volker Abetz, Macromolecules (2002), 35, 10004-10013;
45) Himabindu Nandivada, Xuwei Jiang and Joerg Lahann, Adv. Mater., 2007, 19, 2197-2208;
46) Patricia L. Golas and Krzysztof Matyjaszewski, Chem. Soc. Rev., 2010, 39, 1338-1354;
47) David Fournier, Richard Hoogenboom and Ulrich S. Schubert, Chem. Soc. Rev., 2007, 36, 1369-1380;
48) Ulrich Mansfeld, Christian Pietsch, Richard Hoogenboom, C. Remzi Becer and Ulrich S. Schubert, Polym. Chem., 2010, 1, 1560-1598;
49) Morten Meldal and Christian Wenzel Tornøe, Chem. Rev. (2008), 108, 2952-3015.

The variety of the syntheses of sequential triblocks and multiblocks already carried out and of the self-assembled structures which result therefrom for the pure materials is, for example, illustrated by the following references:
50) Volker Abetz and Peter F. W. Simon, Adv. Polym. Sci. (2005), 189, 125-212;
51) Nikos Hadjichristidisa, Hermis Iatroua, Marinos Pitsikalisa, Stergios Pispasb and Apostolos Avgeropoulos, Prog. Polym. Sci., 30 (2005), 725-782.

The copolymers can be mixed in the powder state; the mixture of powders can then be melted, left to stabilize and, finally, solidified by cooling. In an alternative form, the melting can be replaced by or combined with the dissolution by means of a solvent, which is subsequently evaporated to restore the solid material.

Compared with all the lamellar structures provided to date, a major distinguishing feature of this structure is the decoupling between the position of the chemical domains and that of the centers of gravity of the molecules. Each domain can be viewed as an asymmetric bilayer 50% filled with similar "transmembrane" central blocks. Alternatively, the structure can be viewed as a juxtaposition of cyclic linear arrangements of chains of molecules aBc/cAb/bCa/aBc/cAb/bCa . . . offset with respect to one another by a half-period, in staggered fashion, as are rows of bricks in a wall. Since each molecule acts therein as a hook for the neighboring molecules, this structure exhibits a resistance to shearing which is considerably higher than that of the normal lamellar structures.

The only competing symmetric structure corresponds to a phase-separated state in which each entity forms a monodomain. From a dynamic viewpoint, considering that the lamellar edifice is put in order by propagation of a local order, it is virtually impossible for such a phase separation to be able to take place starting from a homogeneous mixture of the three entities. Furthermore, from a static viewpoint, the configuration of the chains in each monodomain is identical to its configuration in the mixture since the constraints are the same there. The entropy of the mixture and of the phase-separated state are thus identical. On the other hand, the entropy of the mixture is greater than that of the phase-separated state, with the result that, all in all, the free energy of the phase-separated system is greater than that of the mixture. The NCS structure proposed is thus particularly stable.

Figure 3:
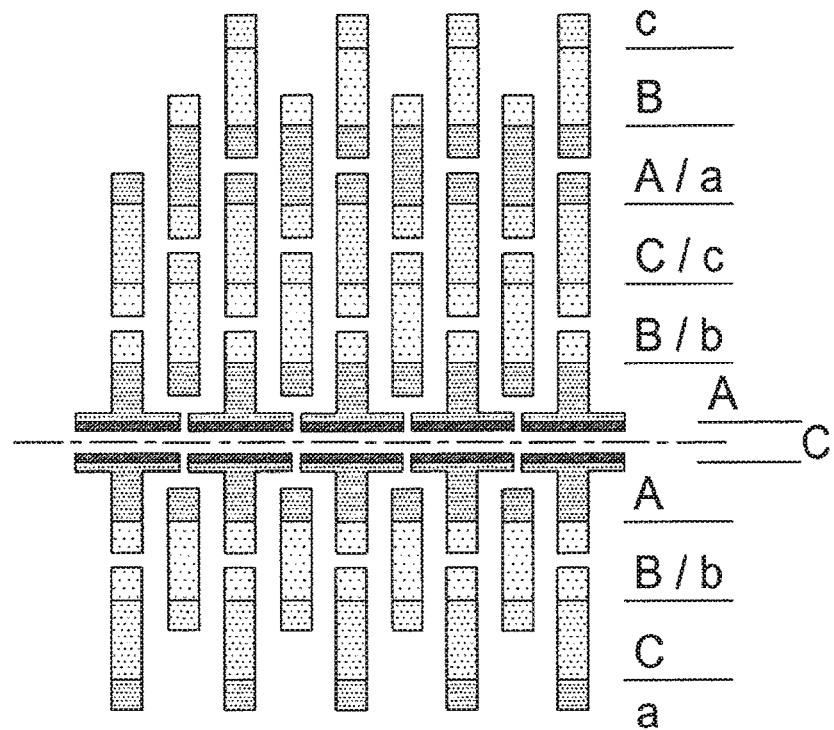
FIG. 3 shows the structure of a defect necessary for the reversal of the polarity in the material of FIG. 2.

This high thermodynamic stability is necessary in order to make possible the formation of macroscopic "monodomain" samples with NCS order but it is not sufficient. This is because it is necessary for the defects capable of reversing the polarity of the NCS structure to be sufficiently rare, which implies that they have a sufficiently high energy cost. FIG. 3 illustrates the defect of reversal which is most "economical" energetically.

Figures 1A, 1B, 1C:
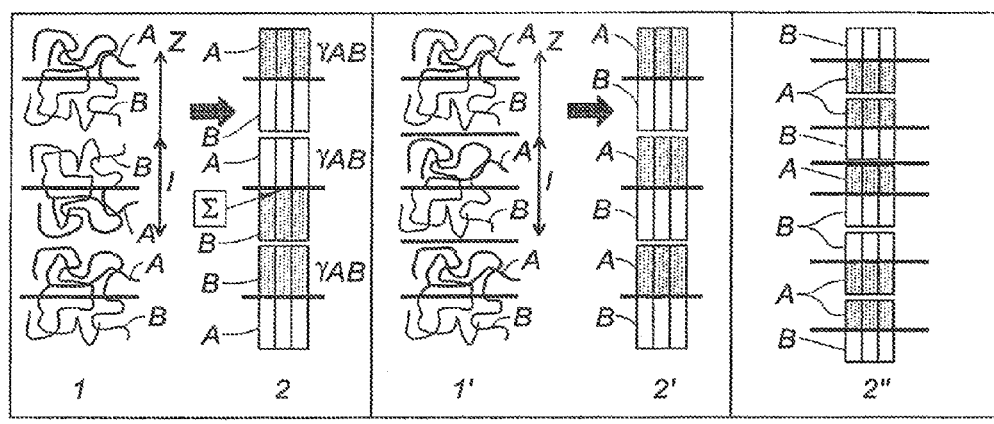
FIGS. 1A, 1B and 1C, which have already been described, respectively illustrate the lamellar structure formed by symmetric diblock copolymers according to the prior art, a theoretical nonsymmetric structure, which is not formed spontaneously by these copolymers, and the structure of a hypothetical defect of stacking of the layers of these copolymers, which does not appear to have ever been observed in practice.

This defect is constructed arbitrarily around the entity C. It is reflected by the presence of three lamellae of abnormal thickness. If I now denotes the thickness of a chemical domain and thus 2I the height of a molecule, the thickness of the domain C at the core of the interface is I/2 and that of the domains A located on either side of the interface is 3I/4. The structure is thus disturbed over a total thickness of 2I and, over this thickness, three interfaces between immiscible entities are found, whereas the same thickness comprises two thereof in bulk. The excess energy per unit of surface area of the defect is thus Y and the volume energy density averaged over the thickness of the defect is 1.5 times that of the material in bulk. This energy is considerable. It is, for example, entirely comparable to that of the defect of stacking in the lamellar structure of a symmetric diblock copolymer represented in FIG. 1C, where an additional AB interface is also included in the region of the defect, i.e. three interfaces over the disturbed thickness 2I instead of two in bulk. In point of fact, it is well known that such defects of stacking in diblocks are rare and easily avoided. The "ferrochemical" materials are thus capable of exhibiting NCS orders without defects over large volumes.

The structure of the interface between the ferrochemical material and a flat solid is also given by FIG. 3, in which only a single one of the two symmetric parts then has to be considered, the dotted axis now representing the solid surface. This structure corresponds to a homeotropic anchoring of the material. The term "homeotropic" reminds us that the ferrochemical structure, when it is liquid, is that of a smectite and more specifically of a smectite A, the molecules being substantially perpendicular to the lamellae. The polar smectic order (that is to say, non-centrosymmetric) is novel.

The composition of the "ferrochemical" material of FIG. 2 can be generalized.

First, the invention is not limited to the use of three triblock polymers (or oligomers) but can be generalized to mixtures of M sequential copolymers or oligomers exhibiting main chains obtained by circular permutation or extracted as parts of said permutations, optionally repeated as many times as necessary, of N individual units or blocks, with 2≤M and N≥3, M=2 and N=3 being excluded and it being possible for some nonneighboring blocks to be similar (for example, it is possible to have a mixture of the following block copolymers: ABAC, ACAD, ADAB, where the "A" block appears twice in each chain in nonadjacent positions, or else ABA'C, ACA'D, ADA'B, where "A" and "A'" are blocks which are similar and compatible but not identical to one another). The proportions of these copolymers or oligomers should ideally be equal, with a tolerance of ±10% or better still of ±2%, but this is not essential.

The blocks indicated by one and the same letter ("A/a", "B/b", and the like) are not necessarily composed of one and the same chemical entity; it is sufficient that they are compatible blocks, within the meaning indicated above. This is important, for example, in the case where the individual units or blocks are composed of polymers or more generally of macromolecules: it is known that, in these cases, the replacement of certain groups by others may only slightly affect the physical and/or chemical properties of the molecule.

The notion of compatibility of the polymers is studied in particular in the papers by Sonja Krause:

52) Pure and Appl. Chem., Vol. 58, No. 12, pp. 1553-1560, 1986; and

53) "Polymer Compatibility", Polymer Reviews, Volume 7, Issue 2, 1972, pages 251-314.

The following handbook:

54) "Polymer data handbook", Oxford University Press, 1999, shows the polymers compatible with a given polymer.

A degree of polydispersity in the chain lengths of the different blocks is accepted. The polydispersity is even capable of promoting the organization of the medium; for example, the polydispersity index PI can be less than or equal to 1.7, preferably less than or equal to 1.4, preferably less than or equal to 1.1, more preferably less than or equal to 1.05.

Furthermore, it is not essential for the various "central" blocks to exhibit the same length. Nor is it essential either for the end blocks to exhibit a length equal to half that of said central blocks. The term "dual blocks" describes chemically similar end blocks having a different closest neighbor; this is, for example, the case of the "a" blocks in the "aBc" and "bCa" triblocks. The sum of the lengths of these dual blocks has to be substantially equal to the mean length of the central block which is chemically similar to them ("A" in "bAc"), to within about 50%, preferably to within about 20%, more preferably to within about 10%.

Figure 4:
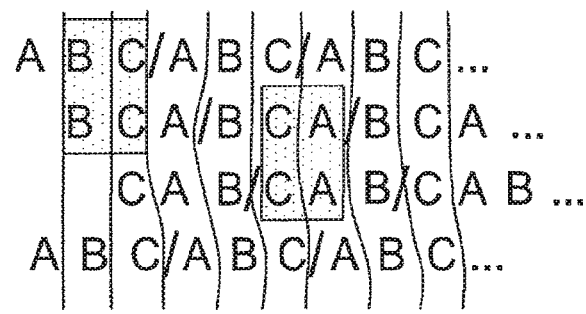
FIG. 4 illustrates, in a highly diagrammatic manner, the structure of a non-centrosymmetric material according to a second embodiment of the invention.
Figure 5:
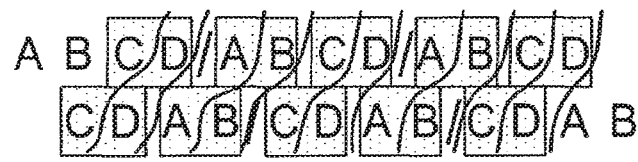
FIG. 5 illustrates, also in the highly diagrammatic manner, the structure of a non-centrosymmetric material according to a third embodiment of the invention.

It is even possible to exclusively use polymers (oligomers) in which all the similar or compatible blocks having similar or compatible neighboring blocks are substantially equal in length between them, without shorter end blocks. By way of example, FIG. 4 shows, in a highly diagrammatic manner, a ferrochemical material composed of a mixture in equal proportions of three triblocks with blocks of the same length. FIG. 5 shows the structure obtained from a mixture of two complementary tetrablocks, ABCD and CDAB.

These two edifices are less harmonious than the preceding one because the end blocks contribute to the creation of interfaces between immiscible entities.

The ferrochemical materials can be used as matrices for the preparation of nanocomposite materials, exhibiting electrically and/or magnetically polar or hyperpolarizable inclusions.

It is known from the prior art to magnify the nonlinear optical properties of polymer materials by introducing hyperpolarizable molecules into the polymer matrix and by orienting them "hot" under an electric field (poling), the combination subsequently being frozen at normal temperature. The molecules are thus maintained in an arrangement contrary to equilibrium. This results in problems of temperature stability and in particular of aging. The same fatigue problems are encountered with piezoelectric, ferroelectric, pyroelectric or ferromagnetic materials.

Figure 6:
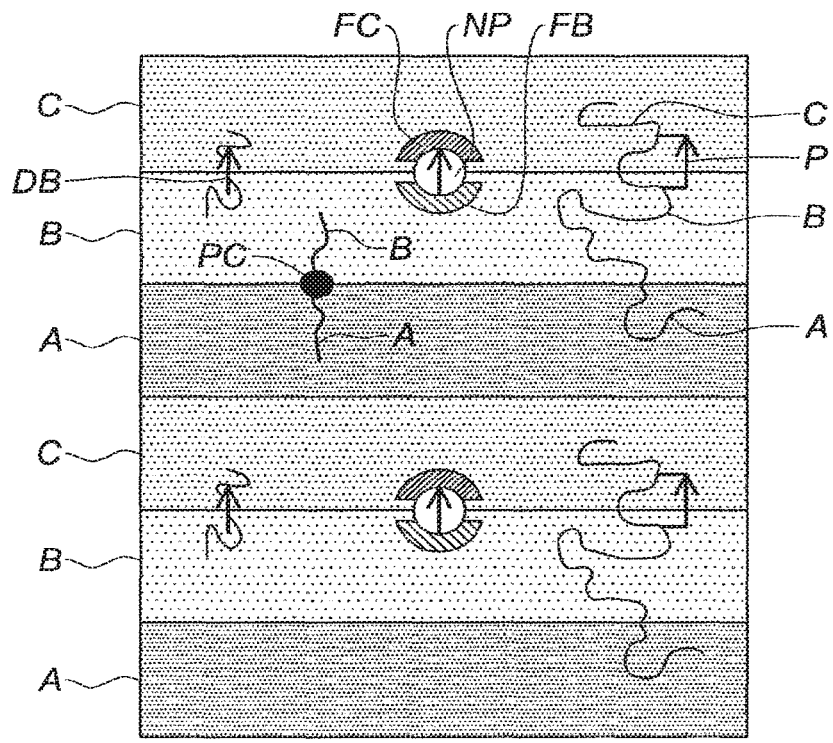
FIG. 6 shows the structure of a hybrid nanocomposite material composed of a lamellar matrix, of the type illustrated in FIG. 2, in which are dispersed oriented inclusions of three different natures.

FIG. 6 shows how, on the contrary, polar or polarizable inserts can be oriented at equilibrium by a ferrochemical matrix. Four solutions are represented in the figure. In the first, a DB diblock, composed of two of the three entities present in the matrix and carrying an electric or magnetic dipole, or a highly polarizable group, is positioned astride the interface between two lamellae. In the second, the insert is composed of a nanoparticle NP, the two hemispheres of which are lined with two different functional groups, FB, FC, exhibiting a preferred affinity with the chemical entities B and C respectively ("Janus grain"); it should be pointed out that, in this case, the nanoparticles are located at the interfaces and not at the core of the lamellae, as often takes place with isotropic nanoparticles, and their orientation is "chemically" forced by the matrix. See, in this connection:

55) Li-Tang Yan, Nicole Popp, Sujit-Kumar Ghosh and Alexander Böker, ACS Nano, Vol. 4 (2), pp. 913-920 (2010);
56) Xue Li, Hui Yang, Limei Xu, Xiaoning Fu, Huanwang Guo and Xiaokai Zhang, Macromol. Chem. Phys., 2010, 211, 297-302;
57) Andreas Walther, Kerstin Matussek and Axel H. E. Müller, *ACS Nano*, 2008, 2 (6), pp. 1167-1178;
58) Frederik Wurm and Andreas F. M. Kilbinger, *Angew. Chem. Int. Ed.*, 2009, 48, 8412-8421;
59) Jaeup U. Kim and Mark W. Matsen, *Phys. Rev. Letters*, 102, 078303 (2009).

In the third case, the dipole or hyperpolarizable group P is installed chemically "as a bridge" between two adjacent blocks of a copolymer component of the mixture.

In the fourth case, the insertion is provided in the form of a linear chain exhibiting two ends formed by two of the blocks making up said copolymers or co-oligomers (A and B), positioned at the level of interfaces between two lamellae, each of which is compatible with one of the two said blocks, and a central part PC incompatible with both said ends and which, due to its incompatibility, gathered up in the form of a ball or drop. The central part can be or comprise a block, a chain of blocks, or one or more nanoparticles.

Figure 7:
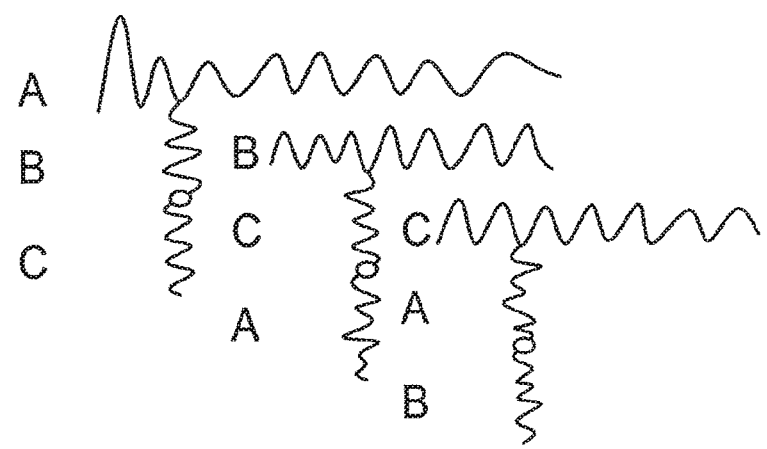
FIG. 7 illustrates the structure of a non-centrosymmetric material according to a fourth embodiment, composed of "comb-shaped" copolymers.

Until now, only the case of materials composed of linear copolymers or co-oligomers has been considered but this is not an essential limitation. FIG. 7 shows the structure of a material according to a fourth embodiment of the invention, obtained by mixing, in identical or similar molar proportions, three "comb-shaped" copolymers respectively composed:
of a main chain A carrying linear sequential diblock chains BC;
of a main chain C carrying linear sequential diblock chains AB; and
of a main chain B carrying linear sequential diblock chains CA.

It is also possible to envisage materials obtained by mixing linear and comb-shaped copolymers/co-oligomers.

In an alternative form, a material according to the invention can be obtained by mixing, in solution, three populations of solid objects, which are optionally flexible, for example rods, in equal proportions. Each object can be organic, dielectric (for example silica) or metallic (for example gold or silver), or semiconducting, or composed of a rigid synthetic or natural polymer (for example xanthan or tobacco virus). It is composed of several sections (for example three), the compatibility or incompatibility of which is controlled by varying their composition (in bulk) or their surface properties, for example by virtue of ion implantation or electron beam irradiation techniques or by cold plasma techniques, or also by techniques for selective grafting or selective absorption of short molecules on their surface after reversible deposition on a support or in a microreactor. These techniques can be applied to objects reversibly deposited for this end on a support.

Preferably, the populations of rods are each obtained by permutation of the sections (for example: ABC, BCA or CAB) and, when their diameter is identical, the lengths of the sections adhere to (in the preferred case of three sections):

either $L_j(ABC)=L_j(BCA)=L_j(CAB)$, with j=A, B or C
or $L_j(jkl)+L_j(klj)=L_j(ljk)$ with k=A, B or C and l=A, B or C and
$j \neq k \neq l$ Preferably, the total length of the objects in the form of rods can be less than or equal to 1 mm, preferably indeed even less than or equal to 100 μm or even less than or equal to 10 μm.

For the manufacture of such objects, reference may be made to:
60) Matthew J. Banholzer et al., *ACS Nano*, Vol. 4, No. 9, pp. 5446-5452.

The invention claimed is:

1. A material exhibiting a macroscopic structure of lamellar and non-centrosymmetric type, comprising:
a mixture of at least two populations of objects which are heterogeneous by blocks along an axis, each formed by a chain of at least two different blocks,
wherein each of said objects is bonded to adjacent objects via interactions involving at least two blocks which are incompatible with one another of said object and two blocks which are compatible one to one with the first said blocks and incompatible with one another arranged along the chain of each said adjacent object,
wherein said structure is formed by a juxtaposition of cyclic linear arrangement of chains of said blocks offset with respect to one another in the direction of said chains, and
wherein each said object is bonded to each adjacent object in all the directions of the material, with the exception of the direction perpendicular to the lamellae, via interactions involving at least two blocks which are incompatible with one another of said object and two blocks which are compatible one to one with the first said blocks and incompatible with one another arranged along the chain of each said adjacent object.

2. The material having a non-centrosymmetric lamellar structure as claimed in claim 1, further comprising a mixture of M populations of objects indexed by m, each said object being composed of a linear chain of P(m) blocks chosen from N individual units, with N_≥3, P(m) and M≥2, the adjacent individual units in each linear chain being chosen to be incompatible with one another.

3. The material having a non-centrosymmetric lamellar structure as claimed in claim 2, wherein each said linear chain of blocks constitutes a portion of length $P(m) \geq 2$ of a sequence obtained by periodic repetition of an orderly set of said individual units.

4. The material having a non-centrosymmetric lamellar structure as claimed in claim 3, further comprising a mixture of 3 populations of objects, each composed of a linear chain of 3 blocks chosen from 3 individual units, the adjacent individual units in each linear chain being chosen to be incompatible with one another.

5. The material as claimed in claim 1, wherein said populations of objects are mixed in substantially equal proportions.

6. A nanocomposite material comprising a matrix composed of a material having a non-centrosymmetric lamellar structure as claimed in claim 1 and polar or polarizable insertions.

7. The nanocomposite material as claimed in claim 6, wherein said insertions comprise Janus nanoparticles (NP) exhibiting a first side and a second side which are chemically different, said particles being positioned at the level of interfaces between two lamellae which are compatible with said first side and said second side respectively.

8. The nanocomposite material as claimed in claim 6, wherein said insertions comprise molecules (D) formed by two of said blocks constituting said copolymers or co-oligomers, positioned at the level of interfaces between two lamellae, each of which is compatible with one of the two said blocks.

9. The nanocomposite material as claimed in claim 6, wherein said insertions comprise linear chains exhibiting two ends formed by two of said blocks (A, B) constituting said objects, positioned at the level of interfaces between two lamellae, each of which is compatible with one of the two said blocks, and a central part (PC) which is incompatible with the two said ends.

10. The nanocomposite material as claimed in claim 7, wherein said insertions also comprise molecules (P) grafted between two said blocks of said objects.

11. The nanocomposite material as claimed in claim 6, in which said insertions exhibit a permanent magnetic and/or electric dipole moment.

12. The nanocomposite material as claimed in claim 6, wherein said insertions exhibit a linear or nonlinear electric, magnetic or optical susceptibility greater by at least a factor of 10 than that of said objects in the presence of the lamella structure in the nanocomposite material.

13. The material s claimed in claim 1, wherein said objects are block copolymers or co-oligomers.

14. The material having a non-centrosymmetric lamellar structure as claimed in claim 13, wherein said copolymers or co-oligomers exhibit a linear or comb-shaped chain.

15. The material as claimed in claim 13, formed by a stack of lamellae, each of said lamellae being formed of just one chemical entity constituting a said block, or else of chemical entities forming compatible blocks, the chains of said polymers or oligomers exhibiting an orientation generally perpendicular to said lamellae.

16. The material as claimed in claim 13, wherein said copolymers or co-oligomers exhibit substantially identical lengths, wherein a standard deviation of the lengths is less than 30%.

17. The material as claimed in claim 13, wherein the blocks which are identical or compatible with one another belonging to different copolymers or co-oligomers exhibit substantially identical lengths, wherein a standard deviation of the lengths is less than 30%.

18. The material as claimed in claim 13, wherein each of said copolymers or co-oligomers exhibits two end blocks (a, b, c) and one or more "central" blocks (A, B, C) between said end blocks; in which at least one central block of a said copolymer or co-oligomer is compatible with at least two end blocks of other said copolymers or co-oligomers, said end blocks exhibiting different closest neighbors, and in which said central block exhibits a length substantially equal to the sum of the end blocks of the other said copolymers or co-oligomers.

19. The material as claimed in claim 13, wherein the constituent blocks of said copolymers or co-oligomers are themselves composed of organic molecules, of mesogenic blocks, of organometallic molecules, of nucleotides, of amino acids or of saccharides.

20. The material as claimed in claim 1, wherein said objects are objects in the form of rods.

21. The material as claimed in claim 20, wherein said objects in the form of rods exhibit a length of less than or equal to 1 mm.

22. The material as claimed in claim 20, wherein said objects exhibit the same dimensions in a plane perpendicular to said axis and are obtained by permutation of three base blocks, indicated by A, B and C, the lengths Lj of which adhere to one of the following conditions:

Lj(ABC)=Lj(BCA)=Lj(CAB) with j=A, B or C; and

Lj(jkl)+Lj(klj)=Lj(ljk) with j,k,l=A B or C and j≠k≠l.

23. The material as claimed in claim 20, wherein said objects in the form of rods exhibit a length of less than or equal to 100 μm.

24. The material as claimed in claim 20, wherein said objects in the form of rods exhibit a length of less than or equal to 10 μm.

25. The nanocomposite material as claimed in claim 7, wherein said insertions also comprise molecules (P) grafted between the two sides of said Janus nanoparticles.

* * * * *

UNITED STATES PATENT AND TRADEMARK OFFICE
CERTIFICATE OF CORRECTION

PATENT NO. : 9,790,312 B2  
APPLICATION NO. : 14/351121  
DATED : October 17, 2017  
INVENTOR(S) : Dominique Ausserre et al.

Page 1 of 1

It is certified that error appears in the above-identified patent and that said Letters Patent is hereby corrected as shown below:

In the Claims

In Line 51, Column 17 in Claim 13, "material s claimed" should be --material as claimed--.

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*